United States Patent [19]

Thirion De Briel et al.

[11] Patent Number: 5,845,750
[45] Date of Patent: Dec. 8, 1998

[54] RAMP MEANS FOR A DEVICE FOR TAKING UP CLEARANCE DESIGNED TO EQUIP A FRICTION CLUTCH, NOTABLY FOR A MOTOR VEHICLE

[75] Inventors: Jacques Thirion De Briel, Colombes; Michel Blard, Issy les Moulineaux, both of France

[73] Assignee: Valeo, Paris, France

[21] Appl. No.: 717,894

[22] Filed: Sep. 23, 1996

[30] Foreign Application Priority Data

Sep. 21, 1995 [FR] France .................................. 95 11091

[51] Int. Cl.⁶ ...................................................... F16D 13/75
[52] U.S. Cl. ..................... 192/70.25; 192/111 A; 188/196 V
[58] Field of Search ............................ 192/111 A, 70.25; 188/196 V, 71.8

[56] References Cited

U.S. PATENT DOCUMENTS

| 4,228,883 | 10/1980 | Palmer ................................. 192/111 A |
| 5,349,882 | 9/1994 | Kamio ............................... 192/111 A X |
| 5,419,418 | 5/1995 | Uenohara et al. ............... 192/111 A X |

FOREIGN PATENT DOCUMENTS

| 000622559 A1 | 11/1994 | Germany ............................ 192/111 A |
| 002273751 A | 6/1994 | United Kingdom ............... 192/111 A |

*Primary Examiner*—Richard M. Lorence
*Assistant Examiner*—William C. Joyce
*Attorney, Agent, or Firm*—Longacre & White

[57] ABSTRACT

A device for taking up clearance designed to equip a diaphragm friction clutch, having circumferentially distributed ramps designed to cooperate with the thrust plate of the clutch, support areas designed to receive the axial force of the diaphragm of the clutch and a toothing designed to drive them in rotation: the device consists of a ring having on one of its faces ramps alternating circumferentially with support areas constituting the support area.

6 Claims, 6 Drawing Sheets

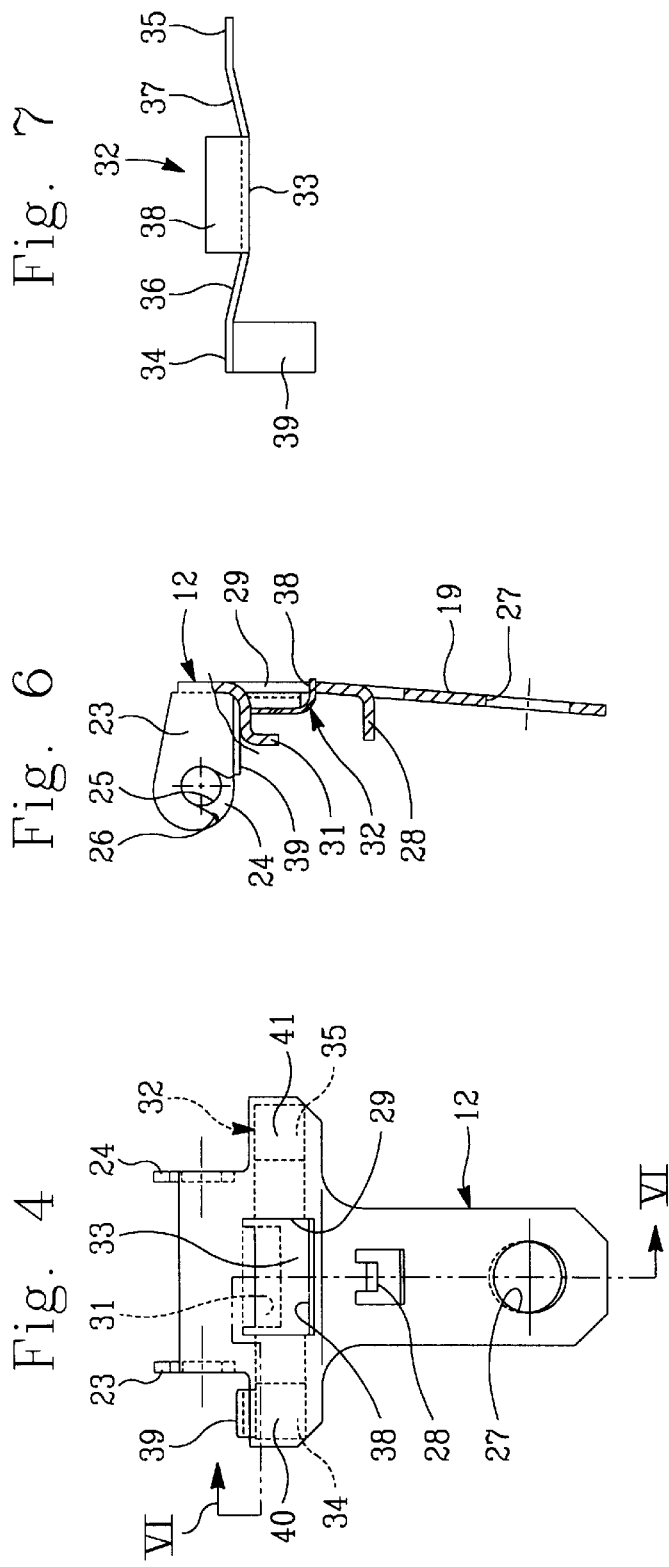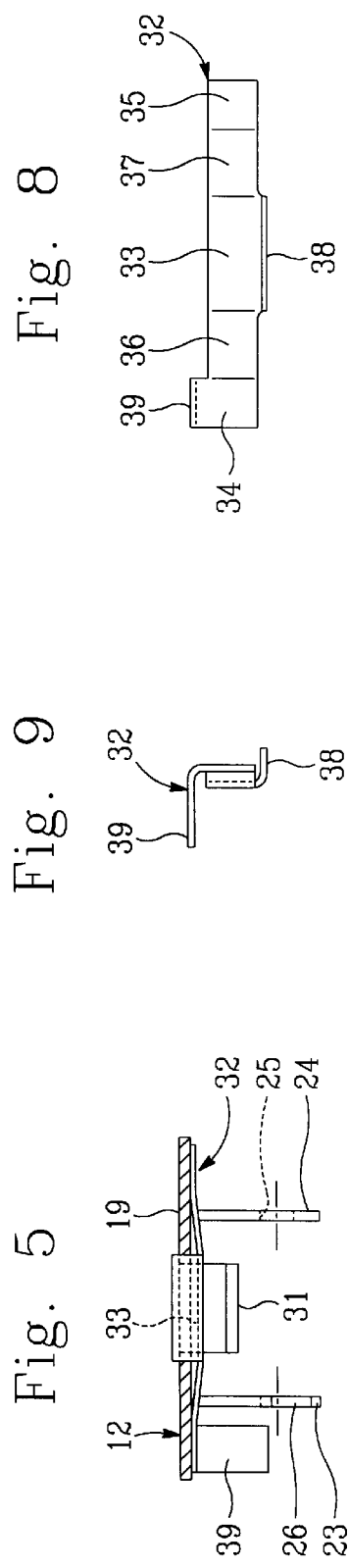

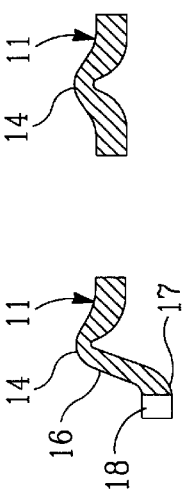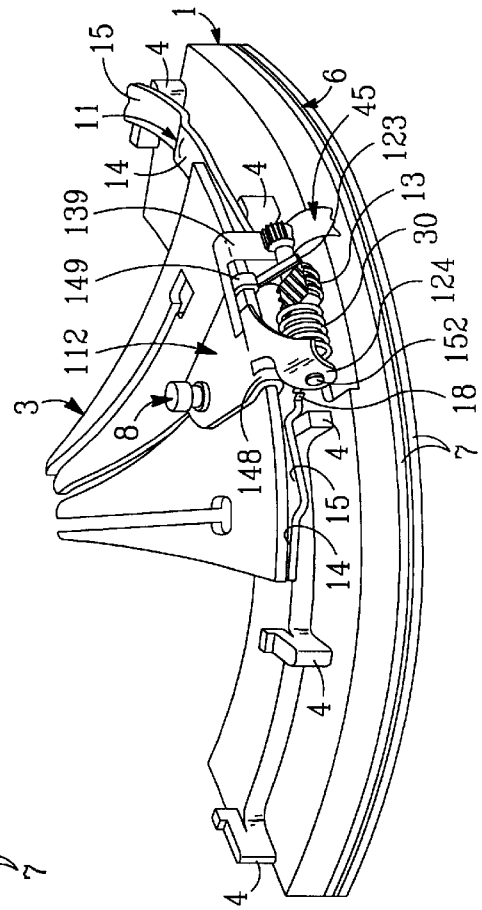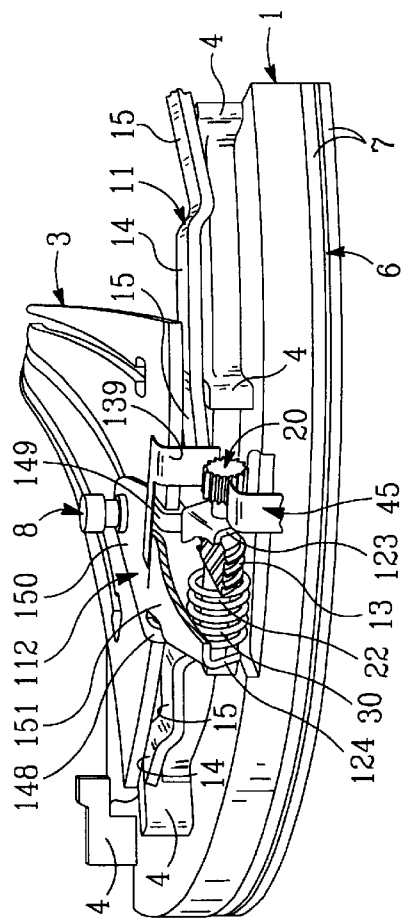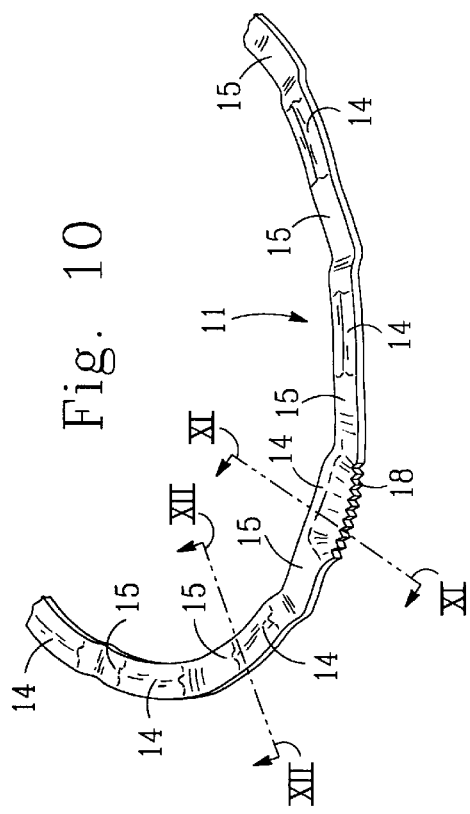

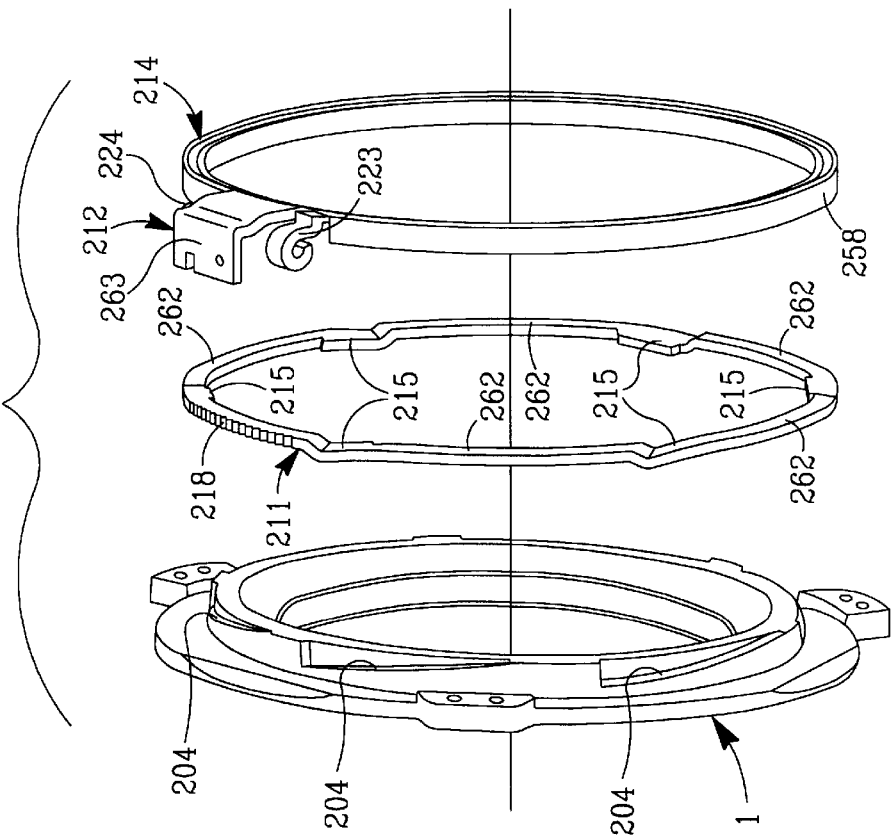
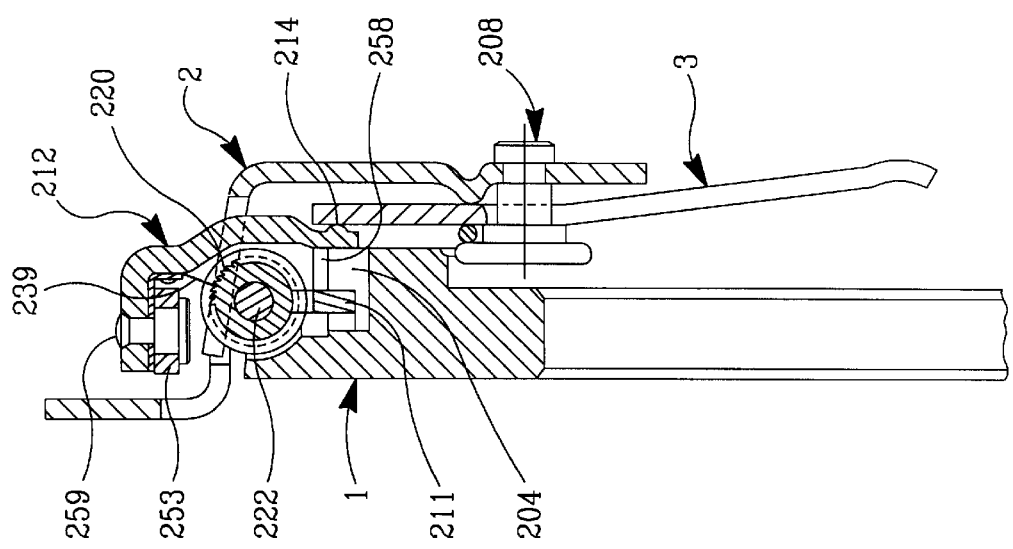

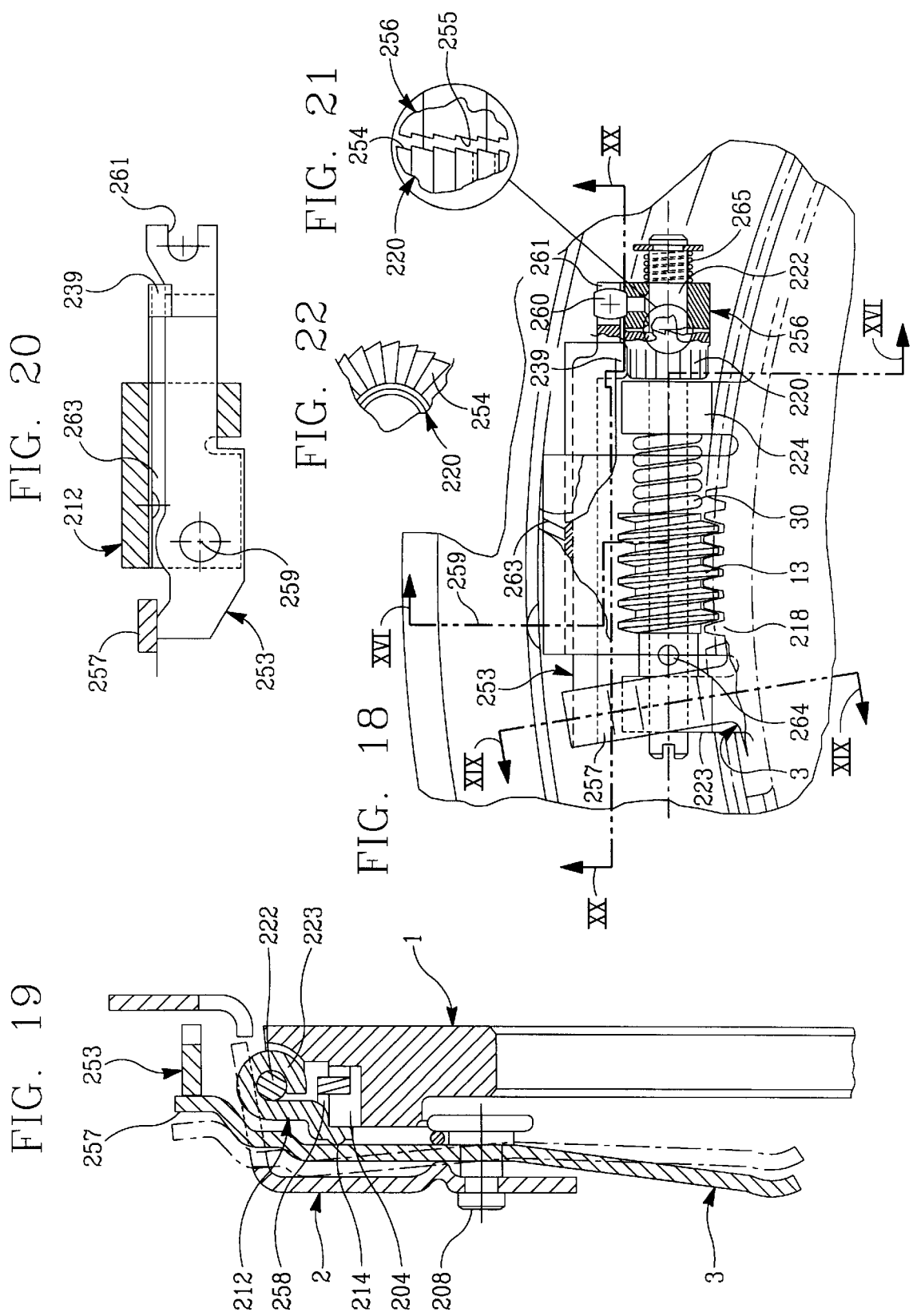

RAMP MEANS FOR A DEVICE FOR TAKING UP CLEARANCE DESIGNED TO EQUIP A FRICTION CLUTCH, NOTABLY FOR A MOTOR VEHICLE

FIELD OF THE INVENTION

The present invention concerns ramp means for a device for taking up clearance designed to equip a friction clutch, notably for a motor vehicle, and more particularly a clutch equipped with a device for taking up clearance due to the wear on the friction linings, the said device operating continuously as the said linings wear.

BACKGROUND OF THE INVENTION

A conventional friction clutch generally has a reaction plate, optionally in two parts to form a damping flywheel, fixed with respect to rotation to a first shaft, usually a drive shaft such as the crankshaft of the internal combustion engine, and supporting, by means of its outer periphery, a cover to which at least one thrust plate is attached.

The thrust plate is fixed with respect to rotation to the cover and reaction plate whilst being able to move axially under the action of controlled axially acting elastic means, generally a metal diaphragm bearing on the cover, whilst a friction disc, carrying friction linings at its outer periphery, fixed with respect to rotation to a shaft, usually a driven shaft such as the input shaft of the gearbox, is interposed between the thrust plate and the reaction plate so as to be gripped between them when the clutch is in the engaged position.

The diaphragm controls the axial movement of the thrust plate when it is actuated by a clutch release bearing. During the service life of such a clutch, the friction linings and the counter-equipment, the thrust plate and reaction plate, wear, which causes a variation in the gripping force between the friction disc on the one hand and the thrust and reaction plates on the other hand, because of changes in the operating conditions of the diaphragm. The travel of the clutch also varies, as well as the force necessary to declutch. By giving such a clutch a device for taking up the clearance due to the wear on the linings, these drawbacks are avoided.

It has already been proposed, according to the document FR-A-2 424 442, to produce a taking-up device by disposing, between the diaphragm and the thrust plate, two annular rings carrying complementary ramps, a first annular ring being rotationally fixed with respect to the thrust plate, the second being rotationally movable with respect to the latter and to the first, the relative circumferential movement of the two rings resulting, because of the complementary ramps which they carry, in a separation of the rings in the axial direction compensating for the said wear, this separation simulating an increase in the axial thickness of the thrust plate; for its relative movement in rotation, the second ring is provided at its periphery with a toothed sector whose teeth mesh with a worm disposed tangentially and mounted so as to rotate on a shaft carried by the clutch cover; the worm is able to be driven in rotation, by means of a unidirectional coupling, by a drum carried by the same shaft which carries the worm, which drum is, in the event of wear in the linings of the friction disc, itself driven in rotation by a lug provided at the periphery of the diaphragm which cooperates with the edges of a notch which the drum has at its periphery; the unidirectional coupling is disposed so that the worm is driven by the drum, which in some way constitutes an arming piece for the device, when the latter is itself driven in rotation by the lug on the diaphragm during declutching, the rotation of the worm resulting in a rotation of the second ring, as stated above.

A unidirectional coupling disposed between the worm and the shaft which supports it enables the latter to retain its rotational position after each adjustment.

In such a device, according to the document FR-A-2 424 442, the second annular ring, which constitutes the ramp means within the meaning of the present application, comprises the ramps proper distributed circumferentially one after the other, and a toothed sector, or toothing, and an annular flange designed to cooperate with the diaphragm by constituting a support bead for the latter; the support bead is continuous and formed at the end of a cylindrical skirt extending parallel to the axis of the clutch from the internal edge of the transverse part where the ramps are formed; moreover, the toothing is provided on a return, also parallel to the axis of the clutch, and therefore extending parallel to the said skirt from the external edge of the transverse part where the ramps are formed. As can be seen, such an arrangement is axially bulky and is not well suited to easy industrial manufacture.

DISCUSSION OF THE INVENTION

The aim of the present invention is to remedy these drawbacks.

According to the invention, ramp means are provided for a device for taking up clearance designed to equip a diaphragm friction clutch, having circumferentially distributed ramps designed to cooperate with the thrust plate of the clutch, support means designed to receive the axial force of the clutch diaphragm and a toothing designed to drive them in rotation, which ramp means consist of a ring having on one of its faces ramps alternating circumferentially with support areas constituting the said support means.

Advantageously, the toothing extends in a plane perpendicular to the axis of the ring.

Preferably one of the support areas carries the said toothing at its outer periphery; the said toothing extends in the plane of the support area. According to another embodiment, the said one of the support areas is extended at its outer periphery by a flange inclined with respect to the axis of the ring and ending in a transverse return provided at its periphery with the said toothing.

Advantageously the support areas are formed by the rounded top edge of clefts disposed in arcs of a circle centred on the axis of the ring.

Preferably the support areas and the ramps are centered with respect to the width of the ring; the ramps are designed to cooperate with studs carried by the thrust plate.

As a variant, the support areas and ramps are offset radially. The ramps are designed to cooperate with complementary ramps carried by the thrust plate.

BRIEF DESCRIPTION OF THE DRAWINGS

In order to give a better understanding of the object of the invention, a description will now be given, by way of examples, purely illustrative and non-limitative, of embodiments depicted in the accompanying drawings.

FIGS. 4 to 6 show the support of the taking-up device, equipped with the elastic member: FIG. 4 is a plan view;

FIG. 5 is a view from below with respect to FIG. 4, and FIG. 6 is a section along VI—VI in FIG. 4;

FIGS. 7 to 9 show the elastic member alone in the positions in which it is depicted, respectively, in FIGS. 5, 4 and 6;

FIG. 10 is a partial perspective view showing the ramp means;

FIGS. 11 and 12 are cross-sectional views of FIG. 10, respectively along the lines XI—XI and XII—XII in this FIG.

in FIG. 13A the clutch is engaged, with new linings; in FIG. 13B the clutch is disengaged, with new linings; in FIG. 13C the clutch is engaged, with worn linings; in FIG. 13D the clutch is disengaged, with worn linings and clearance taken up;

FIGS. 14 and 15 are partial perspective views, respectively slightly from the right and slightly from the left with respect to the support, of a variant device for taking up clearance according to the invention;

FIGS. 16 to 20 show another variant of the device for taking up clearance according to the invention;

FIG. 16 is a partial cross-sectional view of the clutch, equipped with this variant, along XVI—XVI in FIG. 18;

FIG. 17 is an exploded perspective view showing the thrust plate, the ramp means and the support means of the clutch of FIG. 16;

FIG. 18 is a partial plan view of the clutch of FIGS. 16 and 17, in partial cross section and partially cut away;

FIG. 19 is a view in cross section along XIX—XIX in FIG. 18;

FIG. 20 is a view in cross section along XX—XX in FIG. 18;

FIG. 21 is an enlarged view of the magnification in FIG. 18;

FIG. 22 is a partial view of the lateral face of the ratchet wheel shown notably in FIG. 18.

DESCRIPTION OF THE PREFERRED EMBODIMENTS

Figure 2:
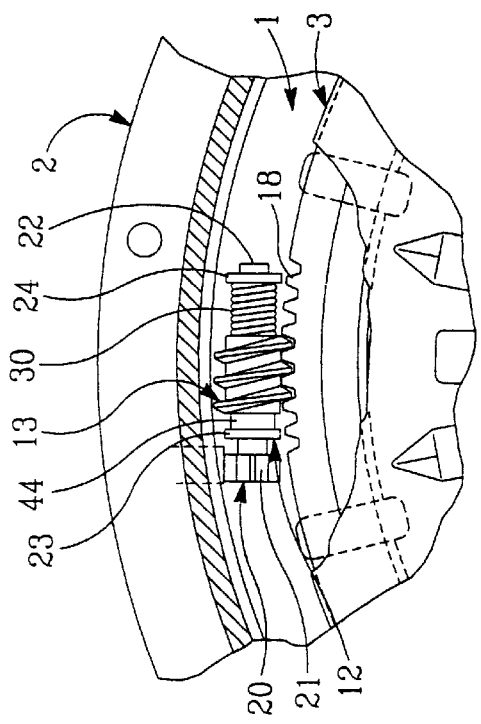
FIG. 2 is a partial plan view of the clutch of FIG. 1 in partial section and partially cut away.
Figure 3:
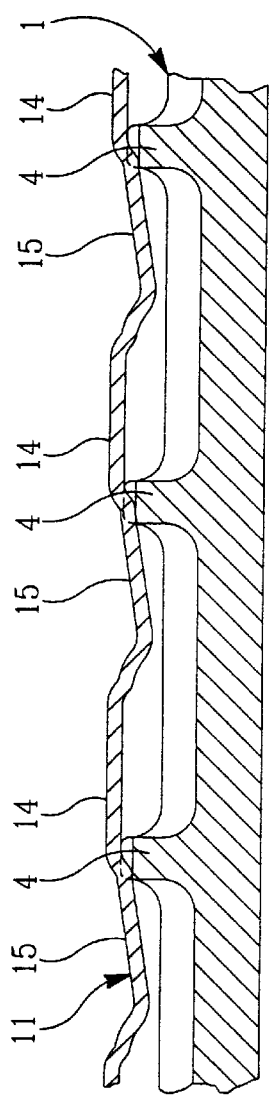
FIG. 3 is a partial view in cross section of the thrust plate and of the ramp means of the clutch of FIGS. 1 and 2.

Referring to FIGS. 1 to 12, a friction clutch mechanism can be seen, notably for a motor vehicle, which comprises a thrust plate 1 designed to cooperate with a friction disc 6, carrying friction linings 7 at its outer periphery, and which itself cooperates with a reaction plate. The reaction plate, not shown, is designed to be fixed with respect to rotation to a drive shaft, such as the crankshaft of an internal combustion engine. The friction disc 6 is fixed with respect to rotation to a driven shaft such as the input shaft of the gearbox.

The thrust plate 1 is fixed with respect to rotation to a hollow-shaped cover 2 by means of tangential tongues 5 which, being elastic, constitute at the same time means of returning the thrust plate 1 towards the cover 2.

The thrust plate 1, whilst being fixed to the cover 2 with respect to rotation, is therefore movable axially with respect to the cover 2 under the action of controlled axially acting elastic means, here a diaphragm 3 pivotally mounted on the cover 2 by means of small columns 8 carried by the base of the cover 2 with a central hole.

In order to compensate for the clearance due to the wear on the linings 6 of the friction disc 7, and to a lesser extent the wear on the thrust plate 1 and reaction plate whose faces, referred to as friction faces, wear in contact with the lining 6 of the disc 7, a device for taking up clearance 10 is provided.

The device for taking up clearance 10 comprises ramp means 11 disposed circumferentially. More precisely, these ramp means 11, which can be seen better in FIGS. 3, 10, 11 and 12, consist of a ring made of sheet metal cut out and pressed so as to have ramps 15 alternating circumferentially with support areas 14 formed by the rounded top edge of clefts disposed in arcs of a circle centred on the axis of the clutch.

The thrust plate 1 has, on its face turned towards the base of the cover 2, studs 4 distributed circumferentially at a distance from each other which corresponds to that which circumferentially separates two successive ramps 15, the studs 4 being designed to cooperate each with a ramp 15.

The ramp means 11 are placed axially between the diaphragm and the thrust plate 1 so that the studs 4 receive the ramps 15 and the diaphragm 3 cooperates with the support areas 14, which thus constitute the support means by means of which the diaphragm 3 acts on the thrust plate 1. This arrangement is economical and simple.

One of the support areas 14 of the ramp means 11 is extended at its outer periphery by a flange 16 inclined with respect to the axis of the clutch ending in a transverse return 17, that is to say extending in a plane perpendicular to the axis of the clutch, provided at its periphery with a toothing 18, as can be seen better in FIG. 11.

The device for taking up clearance 10 also comprises a ratchet wheel 20 with inclined teeth 21 fixed to a shaft 22 which also carries a worm 13; the thread and pitch of the worm 13 are adapted to the toothing 18 of the ramp means 11. The worm 13 is caused to cooperate with the toothing 18 under the conditions which will be described below.

The shaft 22 of the ratchet wheel 20 is rotatably carried by a support 12, more clearly visible in FIGS. 4 to 6, made of sheet metal cut out and folded, having a substantially plane body 19, in the form of a cross, the top part of which carries two wings 23, 24 designed to support the shaft 22; for this purpose, one of the wings, the wing 24, carries a circular hole 25 adapted to the diameter of the shaft 22, whilst the other wing, the wing 23, carries a notch 26, with a circular bottom adapted to the diameter of the shaft 22, extending obliquely with respect to the body 19 of the support 12.

The bottom part of the body 19 of the support 12 has a circular opening 27 adapted to have the cylindrical body 9 of a small column 8 supporting the diaphragm 3 pass through it.

At its center, the body 19 of the support 12 carries a lug 28, obtained here by cutting out and folding, extending perpendicularly to the body 19 on the same side as the wings 23 and 24. In the area situated between that which carries the wings 23 and 24 and the lug 25, the body 19 is also cut out to produce a passage 29, rectangular overall, and bent to obtain a hook 31, the end of which is parallel to the body 19 whilst being directed towards the lug 28.

On each side of the passage 29, the body 19 has arms 40, 41.

The support 12 is adapted to receive an elastic member 32, more clearly visible in FIGS. 7 to 9; the elastic member 32 is a strip, of rectangular shape overall, bent and having a central part 33 and two end parts 34, 35 parallel to the central part 33, to which they are connected by oblique parts 36, 37; the central part 33 carries on its edge a fold 38 which is perpendicular to the central part 33 and which extends, with respect to this central part 33, from the side where the angle included by the oblique parts 36, 37 is less than 180°. One of the end parts, here the part 34, is slightly wider, on the side opposite that where the fold 38 is situated, also carrying on its edge, perpendicularly, a fold constituting a non-return pawl 39, whose role will emerge below.

As can be seen in FIGS. 4 to 6, which show the support 12 equipped with the elastic member 32, this is disposed so that its end parts 34, 35 cooperate with the face of the arms 40, 41 of the body 19 turned towards the wings 23, 24; the central part 33 of the elastic member 32 cooperates through its top edge, as seen in FIGS. 4 and 6, with the horizontal part of the hook 31 towards which it is pushed elastically by the fold 38 which bears on the bottom edge of the passage 29; in this position of the elastic member 32, its central part 33 is at a distance from the plane of the passage 29, because of the obliquity of the oblique parts 36 and 37, and the nonreturn pawl 39 is in line with the top edge of the arm 40, offset laterally with respect to the closest wing, namely the wing 23.

The support 12 is adapted to be mounted on the diaphragm 3 before the latter is fixed to the cover; the support 12 is placed on the external face of the diaphragm 3 whilst causing the outer circumferential edge of the diaphragm 3 to be straddled by the hook 31 of the support 12 and in such a way that the opening 27 in the body 19 of the support 12 is in line with the passage 42 in the diaphragm 3 for the body 9 of a small column 8; a slot 43 extending circumferentially can be provided in the diaphragm 3, as depicted, to receive the lug 28 on the body 19 of the support 12 and thus ensure its positioning and holding in the circumferential direction. It then suffices to fix the diaphragm 3 to the cover 2 by crimping the small columns 8, as is usual, in order to finally fix the support 12 to the diaphragm 3.

To position the support 12 in the circumferential direction, the slot 43 provided in the diaphragm 3 could be omitted and replaced with a notch provided on the edge of the diaphragm 3 in which the hook 31 of the support 12 would fit: naturally, according to this variant, not depicted, the lug 28 of the support 12 would also be omitted.

At a slight distance from the ratchet wheel 20, the shaft 22 carries a collar 44 adjacent to the worm 13; around the shaft 22, on the opposite side to the one where the ratchet wheel 20 is placed, with respect to the worm 13, a helical spring 30 is placed, constituting the elastic taking-up means, as described below; the free end of the shaft 22 is then introduced into the hole 25 in the wing 24 of the support 12; by compressing the spring 30, the part of the shaft 22 lying between the collar 44 and ratchet wheel 20 is then introduced into the notch 26 in the wing 23 of the support 12: in this position, the ratchet wheel 20 is in line with the non-return pawl 39 which, by cooperation with the inclined teeth 21 of the ratchet wheel 20, on the one hand elastically holds the shaft 22 at the base of the notch 26 and on the other hand prevents the ratchet wheel 20, as well as the worm 13, from rotating in an anticlockwise direction, as seen in FIGS. 1 and 13A to 13D.

Figure 1:
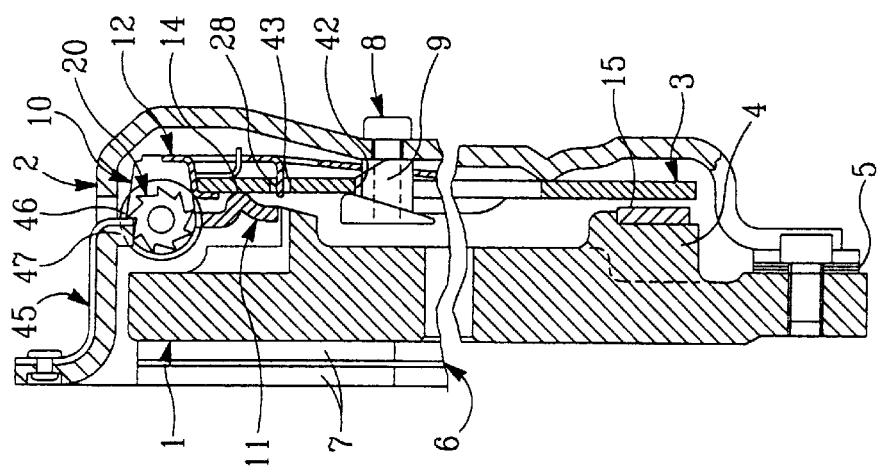
FIG. 1 is a partial view in cross section of a clutch equipped with a device for taking up clearance according to the invention.

The support 12, carrying the ratchet wheel 20, the shaft 22 of which supports the worm 13 and helical spring 30, being fixed to the diaphragm 3, moves with it during the disengagement and re-engagement operations, and this with respect to the cover 2; the latter carries at its periphery an elastic stop blade 45 extending for the major part outside the cover 2, to which it is fixed here by riveting by means of the radial edge for fixing the cover 2 to the reaction plate, and having an end 46 which passes through it while extending along a transverse return 47 in order to cooperate with the inclined teeth 21 on the ratchet wheel 20, diametrically opposite overall with respect to the non-return pawl 39; it will be understood that, by virtue of this arrangement, by moving the ratchet wheel 20 from right to left, as seen in FIG. 1, the end 46 of the blade 45, by cooperation with the transverse return 47 on the cover 2, fulfils the role of a fixed point for the teeth 21 on the ratchet wheel 20 so that the latter is caused to rotate in a clockwise direction; when the ratchet wheel 20, on returning, is moved from left to right, the elasticity of the blade 45 and the inclination of the teeth 21 mean that it lift the blade 45, whilst being maintained fixed in rotation by the pressure of the non-return pawl 39.

The device for taking up clearance which has just been described functions as follows.

Figure 13A:
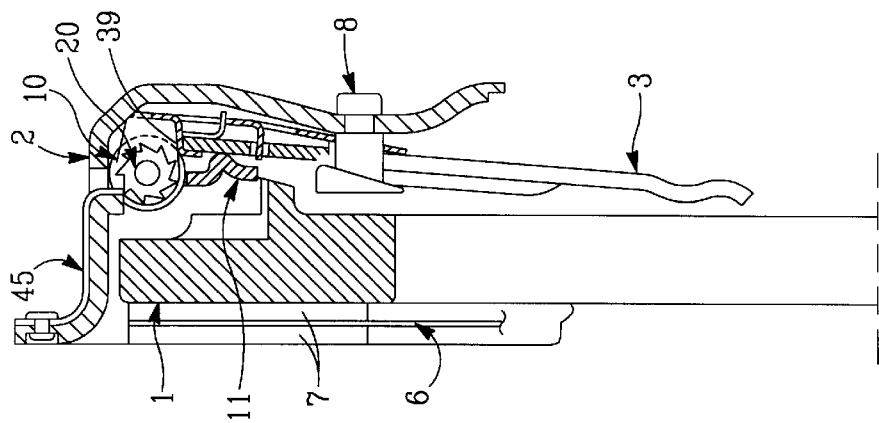
FIGS. 13A to 13D show partially in section various positions of the components making up the clutch.

FIG. 13A depicts the clutch engaged, the linings 7 of the friction disc 6 being in the new state and gripped between the reaction plate, not shown, and the thrust plate 1. In this position, the collar 44 of the shaft 22 is in abutment with the wing 23 of the body 19, pushed by the helical spring 30, as depicted in FIG. 2. Moreover, the end of the blade 45 is at the root of a tooth on the ratchet wheel 20 and the non-return pawl 39 on the tip of a tooth, as shown in FIG. 13A.

Figure 13B:
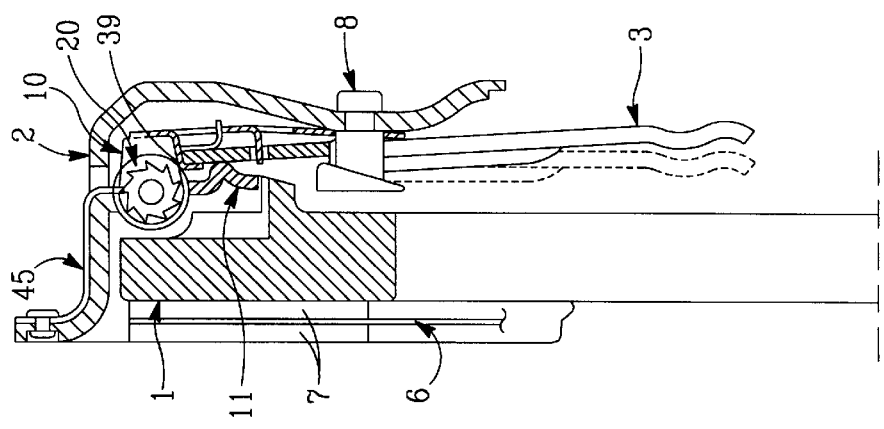

When the clutch is disengaged, the diaphragm 3 has tilted about the small columns 8, driving at its periphery the support 12 towards the base of the cover 2; since the support 12 radially extends beyond the diaphragm 3 by its top part which carries the wings 23, 24, it may happen that the support 12 comes into abutment against the cover before the diaphragm has reached its disengagement end of travel position; this is the reason why the elastic member 32 has oblique parts 36, 37, which are at the end of its travel crushed by the diaphragm which is detached from the transverse end of the hook 31 in which it is mounted without clearance, as is shown in FIG. 13B, which depicts the clutch at the end of disengagement, the linings 7 of the friction disc 6 being still new. During the movement of the support 12 by the diaphragm 3, the end of the elastic blade 45 has followed the inclined ramp constituted by the tooth, in the root of which it was situated in the previous step, the teeth 21 on the ratchet wheel 20 being produced so that, during this disengagement travel with new linings, the end of the blade 45 does not jump a tooth, whereas moreover the nonreturn pawl 39 which, still on the tip of the same tooth, holds the ratchet wheel 20.

Figure 13C:
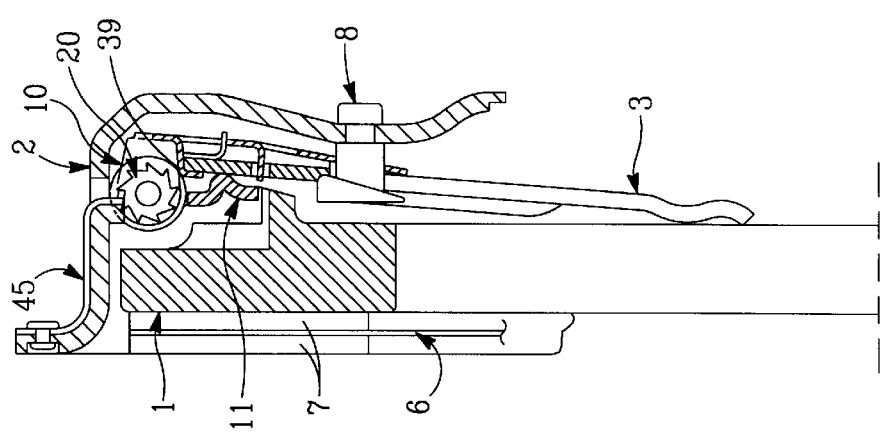
Figure 13D:
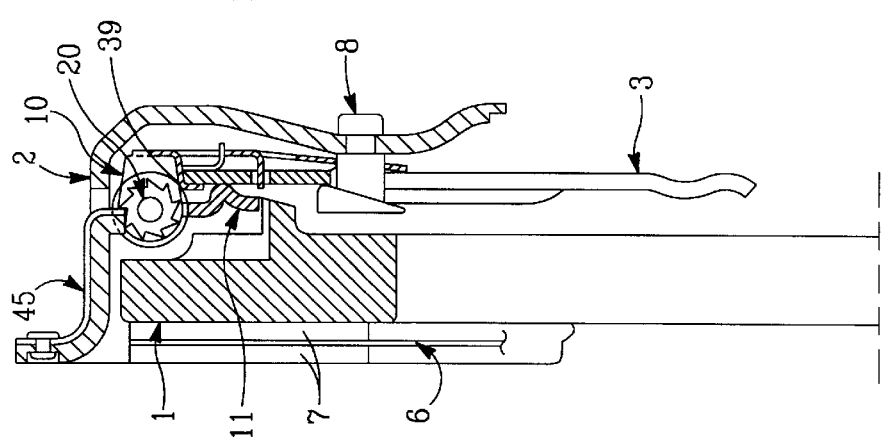

When the linings 7 wear, as is known the thrust plate 1, still subjected to the axial force of the diaphragm 3, moves closer to the reaction plate, which is fixed axially like the cover 2; the periphery of the diaphragm 3 therefore moves closer to the reaction plate, and therefore to the open end of the cover 2, driving the support 12 in its tilting; the ratchet wheel 20 also moves closer to the reaction plate but, as the end of the blade 45 was at the root of the tooth before wear, the ratchet wheel 20 is in abutment on the blade 45 when it moves during wear. Consequently, the said wheel 20 rotates about its axis in the clockwise direction, a direction in which the non-return pawl 39 does not fulfill its function but can jump from one tooth to another; the engaged clutch, with worn linings, is depicted in FIG. 13C. This rotation of the ratchet wheel 20 causes the worm 13 also to rotate on its axis; the ramp means 11 being immobilized with respect to the cover 3 under the effect of the load of the diaphragm 3, the worm 13, which meshes with the toothing 18 on the ramp means 11, is as it were screwed on this toothing whilst compressing the helical spring 30, the direction of the thread of the worm 13 being designed so that this is the case.

During the disengagement operation which follows the wear phase which has just been described, the thrust plate 1 releases the linings 7 whilst moving away from them under the action of the tangential tongues 5, which return it towards the base of the cover 2, as well as the ramp means 11 in contact with the diaphragm 3 through their support areas 14 and with the studs 4 of the thrust plate 1 through their ramps 15. The helical spring 30 forces the worm 13 towards the wing 23, which it left in the wear phases, that is to say from right to left as seen in FIG. 2; since the load on the diaphragm 3 is no longer applied to the ramp means 11, the only force to be overcome in order to be able to rotate these ramp means 11 with respect to the thrust plate 1 is the return force of the tangential tongues 5. If the load of the helical spring 30 is sufficient to overcome this force, then the spring 30 moves the worm 13, prevented from rotating on itself by the non-return pawl 39, which will drive the toothing 18: by rotating on themselves, the ramps 15 of the ramp means 11, by cooperation with the studs 4 of the thrust plate 1, will move the thrust plate 1 away from the base of the cover 2, thus increasing the axial distance between the working face of the thrust plate 1 and the support areas 14 of the ramp means 11, thus taking up the clearance due to the wear on the linings 7. Since the load of the helical spring 30 is a function of the quantity by which it has been compressed by the worm 13 during the wear phases, it can be seen that several engagement and disengagement operations may be necessary before the device for taking up clearance 10 enters the taking-up phase this being a function of the relative sizing of the components concerned. By way of example, the latter can be produced so that this taking-up phase occurs only after a wear corresponding to three tenths of a millimeter; moreover, it can also be seen that it is impossible for the device 10 according to the invention to take up any clearance without there having been actual wear.

In the variant which has just been described, the shaft 22, the worm 13, the collar 44 and the ratchet wheel 21 are made in a single piece; naturally the worm 13 could be a separate piece and provided with a bore, the said bore and the shaft itself being arranged so that the worm can slide along the shaft while being fixed to the shaft with respect to rotation.

FIGS. 14 and 15 depict a variant of the device for taking up clearance. In these figures, the components identical to those described previously, or fulfilling the same role, have been designated by the same reference numeral, or by this reference numeral increased by one hundred; consequently, this variant will be described briefly. Here, the support 112 has a plate 150 of triangular shape overall clamped onto the diaphragm 3 by means of a small column 8, two hooks 148, 149, at a circumferential distance from each other, gripping the diaphragm 3 at its periphery; the plate 150 is extended outwards by a cap 151 which is more inclined with respect to the axis of the clutch than is the plate 150; the cap 151 carries laterally, on each of its sides, a wing, respectively 123, 124; the wings 123, 124 support, as did previously the wings 23, 24, the shaft 22 equipped with the ratchet wheel 20, worm 13 and spring 30; the ratchet wheel 20 is in line with the elastic blade 45 carried by the cover, not shown in these figures, and the non-return pawl 139, here fixed to the plate 150 of the support 112, for example by welding. The free end of the shaft 22 is flattened at 152 so that there is a subassembly, consisting of the support 112 equipped with the non-return pawl 139, the shaft 22 carrying the ratchet wheel 20, the worm 13 and the spring 30, ready to be mounted on the diaphragm and clamped by means of a small column 8.

FIGS. 16 to 22 show a variant of the taking-up device according to the invention; in these figures, the components identical to those previously described with regard to FIGS. 1 to 13, or fulfilling the same role, are designated by the same reference numeral, or by this reference numeral increased by two hundred.

Since the operation of this variant is identical to that of the previous variants, only the design features which distinguish this variant will be described.

As FIG. 17 shows clearly, according to this variant, the ramp means 211 are provided with ramps 215 and transverse plane parts 262, alternating circumferentially, and a toothing 218; the support means 214 for the diaphragm 3 are provided on an annular piece independent of the ramp means 211 and whose cylindrical skirt 258 is adapted to cooperate axially with the transverse plane parts 262 of the ramp means 211 whose ramps 215 are adapted to cooperate with, here, complementary ramps 204 on the thrust plate 1; naturally these complementary ramps 204 could be replaced by studs as in the previous variant, and vice versa moreover.

According to this variant also, a support 212 is fixed to the support means 214; the support 212 comprises a kind of cap, with an L-shaped cross section, the front wall 263 of which extends axially, flanked laterally by two wings or brackets 223, 224 designed to support a shaft 222; the support 212 is formed from the skirt 258 of the support means 214 for the diaphragm 3.

As can be seen in FIG. 18, the shaft 222 is fixed to a ratchet wheel 220; after being introduced into the bracket 224, with the ratchet wheel 220 to the outside, the helical spring 30 and then the worm 13 are fitted onto the shaft which is then introduced into the bracket 223; a pin 264 fixes the worm 13 and shaft 222 together with respect to rotation. The ratchet wheel 220 cooperates with a non-return pawl 239 carried by the front wall 263 of the support 212.

The ratchet wheel 220 carries, on its transverse face opposite to that which is turned towards the bracket 224, circumferentially inclined teeth 254, visible on the magnification in FIG. 21 and in FIG. 22; the shaft 222 is extended beyond the ratchet wheel 220 and carries rotatably, on this end, a nut 256 whose face turned towards the ratchet wheel 220 carries teeth 255 conjugate with respect to the teeth 254 and visible on the magnification in FIG. 21 a light spring 265 ensures cooperation of the teeth 254 and 255, notably in the driving direction, the ratchet wheel 220 and the nut 256 fulfill the role, by virtue of the teeth 254, 255, of a unidirectional coupling between the shaft 222 and a lever 253, as will be described now the nut 256 carries at its periphery a radial pivot 260 in the overall shape of an olive which straddles the end of the lever 253 by virtue of a notch 261 which is provided thereon. The lever 253 is pivoted about a shaft 259 carried by the front wall 263 of the support 212; the other end of the lever 253, opposite to the one which carries the notch 261, cooperates with a radial lug 257 which the diaphragm 3 has at its periphery for manoeuvring the lever 253 in wear phases. This is because, the lug 257 on the diaphragm 3 being in contact with the lever 253 at a point situated on a radius larger than that on which the support means 214 are placed which, as is known, move axially in wear phases, the effect of the wear on the lever 253 is thus multiplied; another multiplication effect is obtained through the lever 253 whose shaft 259 is closer to the point of contact with the radial lug 257 than to the notch 261. Thus, through the clearance of these various lever arms, it is possible for example to arrange that, during a normal engagement and disengagement travel without wear the same teeth 254 and 255 remain in contact; in wear phases, there is a jump from one tooth to another, which on each occasion causes the worm 13 to rotate, which progressively compresses the helical spring 30 whilst being screwed on the toothing 218 with the clutch engaged; when the load of the spring 30 reaches that of the tangential tongues which return the thrust plate 1, the helical spring 30 moves the worm 13 in translation, which rotates the ramp means 211, with the clutch disengaged, as in the previous variants.

It will be appreciated, with regard to the variants in FIGS. 1 to 15, that the number of parts is reduced since the ramp means 11 carry the support means 14 for the diaphragm 3. There is also, according to these variants, a multiplication effect: thus, for a given disengagement travel, when re-engaging from the position depicted in FIG. 13D, the clutch is once again in the position shown in FIG. 13A.

As will have been understood, the wear is detected by virtue of the blade 45, or the lug 257; thus the wear detector (45, 257) can be carried by different components of the clutch.

What is claimed is:

1. A diaphragm friction clutch having a friction disc (6) carrying friction linings (7), a thrust plate (1) designed to cooperate with the friction disk (6), a diaphragm (3), support means (14) designed to receive an axial force of the diaphragm (3), toothing means (18) arranged to drive the support means (14) in rotation, ramp means disposed axially between the diaphragm (3) and the thrust plate (1) and comprising a ring (11) having on one of its faces circumferentially distributed ramps (15) designed to cooperate with the thrust plate, said ring carrying the support means (14) for the diaphragm (3) wherein the ramps (11) are designed to cooperate with studs (4) carried by the thrust plate, and wherein said studs are distributed circumferentially at a first distance from each other which corresponds to a second distance which circumferentially separates two successive ramps (15).

2. A diaphragm friction clutch as claimed in claim 1 wherein the support means (14) have support areas designed to receive the axial force of the diaphragm and wherein said support areas alternate circumferentially with the ramps.

3. A diaphragm friction clutch as claimed in claim 2 wherein one of the support areas carries said toothing means at its outer periphery in a plane perpendicular to the axis of the ring of the ramp means.

4. A diaphragm friction clutch as claimed in claim 2, wherein the support areas consist of the rounded top edge of clefts disposed in arcs of a circle centered on the axis of the ring.

5. A diaphragm friction clutch as claimed in claim 2, wherein the ramps and the support areas are centered with respect to the width of the ring.

6. A diaphragm friction clutch as claimed in claim 2, wherein the support areas and the ramps are offset radially.

* * * * *